(12) United States Patent
Hoff et al.

(10) Patent No.: US 7,877,183 B2
(45) Date of Patent: Jan. 25, 2011

(54) POWER TRAIN CONTROL SYSTEM WITH ENGINE SPEED OVERRIDE

(75) Inventors: Brian Douglas Hoff, East Peoria, IL (US); Mark Edward Rettig, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 456 days.

(21) Appl. No.: 11/987,527

(22) Filed: Nov. 30, 2007

(65) Prior Publication Data

US 2009/0143946 A1 Jun. 4, 2009

(51) Int. Cl.
*G06F 7/00* (2006.01)

(52) U.S. Cl. ............... 701/51; 701/54; 701/110; 477/34; 477/54; 123/351

(58) Field of Classification Search ............ 701/22, 701/50, 51, 54, 104, 105, 110; 477/30, 34, 477/50, 54, 121; 123/332, 333, 351, 352, 123/492, 493
See application file for complete search history.

(56) References Cited

U.S. PATENT DOCUMENTS

| | | | |
|---|---|---|---|
| 5,830,104 A | 11/1998 | Desautels et al. | |
| 6,755,177 B2 | 6/2004 | Woolford et al. | |
| 6,799,110 B2 | 9/2004 | Hashimoto et al. | |
| 7,063,056 B2 | 6/2006 | Nakai et al. | |
| 2002/0056581 A1 | 5/2002 | Mianzo et al. | |
| 2002/0137597 A1 | 9/2002 | Genise et al. | |
| 2003/0158645 A1 | 8/2003 | Czarnecki et al. | |
| 2004/0249543 A1 | 12/2004 | Kilworth et al. | |
| 2005/0016162 A1 | 1/2005 | Mehta et al. | |
| 2005/0092290 A1 | 5/2005 | Gudgeon et al. | |
| 2005/0109302 A1 | 5/2005 | Tetsuno et al. | |
| 2007/0169743 A1 | 7/2007 | Kobayashi et al. | |
| 2007/0233335 A1* | 10/2007 | Kumar et al. ............... 701/22 | |
| 2007/0251740 A1 | 11/2007 | Betz et al. | |

* cited by examiner

*Primary Examiner*—Gertrude Arthur Jeanglaud
(74) *Attorney, Agent, or Firm*—Finnegan, Henderson, Farabow, Garrett & Dunner LLP

(57) ABSTRACT

A power train is provided having an engine operably coupled to a transmission. The power train also has at least one operator interface device, each operator interface device being configured to generate an operator request. In addition, the power train has a controller configured to, in response to a first operator request, override a second operator request for a desired target engine speed by lowering a current engine speed to a modified target engine speed below the desired target engine speed.

20 Claims, 4 Drawing Sheets

POWER TRAIN CONTROL SYSTEM WITH ENGINE SPEED OVERRIDE

TECHNICAL FIELD

The present disclosure is directed to a transmission control system and, more particularly, to a transmission control system capable of overriding an engine speed request from an operator.

BACKGROUND

When an operator requests a propulsion direction change (i.e., forward or backward propulsion) of a machine, the control system may initially control a drive train to retard motion in the current direction. The control system may initiate such drive train retarding by adjusting the transmission (e.g. downshifting) thereby using parasitic losses to slow the machine down. However, adjusting the transmission to initiate drive train retarding may increase the speed of the engine. If the operator has commanded a target engine speed close to the maximum desirable engine speed, the fueling system may struggle to respond quickly enough (i.e., reduce fueling rate) to prevent the engine from increasing above a maximum desirable engine speed when the drive train retarding is initiated.

One method that has been employed to prevent an operator input from causing the engine speed to exceed a desired limit is disclosed in U.S. Pat. No. 6,755,177 (the '177 patent) issued to Woolford et al. on Jun. 29, 2004. The system disclosed in the '177 patent includes a controller that continuously monitors the engine speed requested by the operator and compares the requested engine speed with a predetermined engine speed. If the requested engine speed is greater than the predetermined engine speed, the system operates in a speed limit mode. In the speed limit mode, the controller maintains the fueling rate to the engine at a level that prevents the actual engine speed from exceeding the predetermined engine speed.

Although the system disclosed in the '177 patent may prevent an operator request from causing the engine speed to exceed a threshold when the requested engine speed is above the threshold, the system's usefulness may be limited during propulsion direction changes. In particular, during propulsion direction changes, an engine speed can rapidly increase above an operator requested engine speed. If the operator requests an engine speed close enough to a threshold engine speed, the actual engine speed may exceed the threshold during the rapid increase associated with the propulsion direction change. Therefore, waiting until the operator requests an engine speed that exceeds the threshold before overriding the operator request may not prevent the operator request from causing the engine speed to exceed the threshold engine speed during propulsion direction changes.

The disclosed system is directed to overcoming one or more of the problems set forth above.

SUMMARY

In one aspect, the present disclosure is directed toward a power train. The power train includes an engine operably coupled to a transmission. The power train also includes at least one operator interface device, each operator interface device being configured to generate an operator request. In addition, the power train includes a controller configured to, in response to a first operator request, override a second operator request for a desired target engine speed by lowering a current engine speed to a modified target engine speed below the desired target engine speed.

Consistent with a further aspect of the disclosure, a method is provided for operating a power system. The method includes receiving a first operator request. In addition, the method includes receiving a second operator request for a desired target engine speed. Furthermore, the method includes overriding the second operator request in response to the first operator request by lowering a current engine speed to a modified target engine speed below the desired target engine speed.

DETAILED DESCRIPTION

Figure 1:
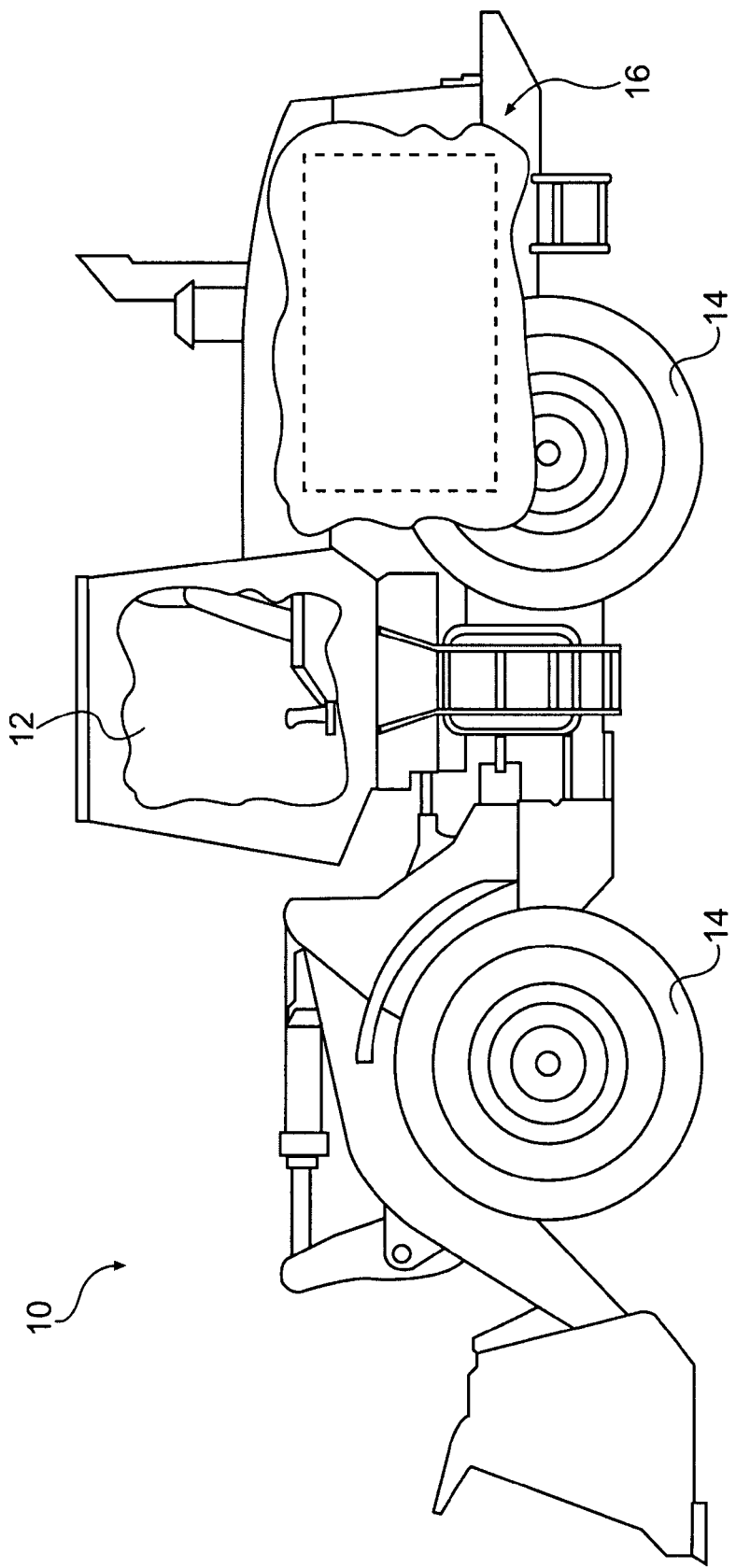
FIG. 1 is an illustration of an exemplary machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the wheel loader depicted in FIG. 1, a bus, a highway haul truck, or any other type of mobile machine known in the art. Machine 10 may include an operator station 12, one or more traction devices 14, and a power system 16 for driving at least one of traction devices 14.

Figure 2:
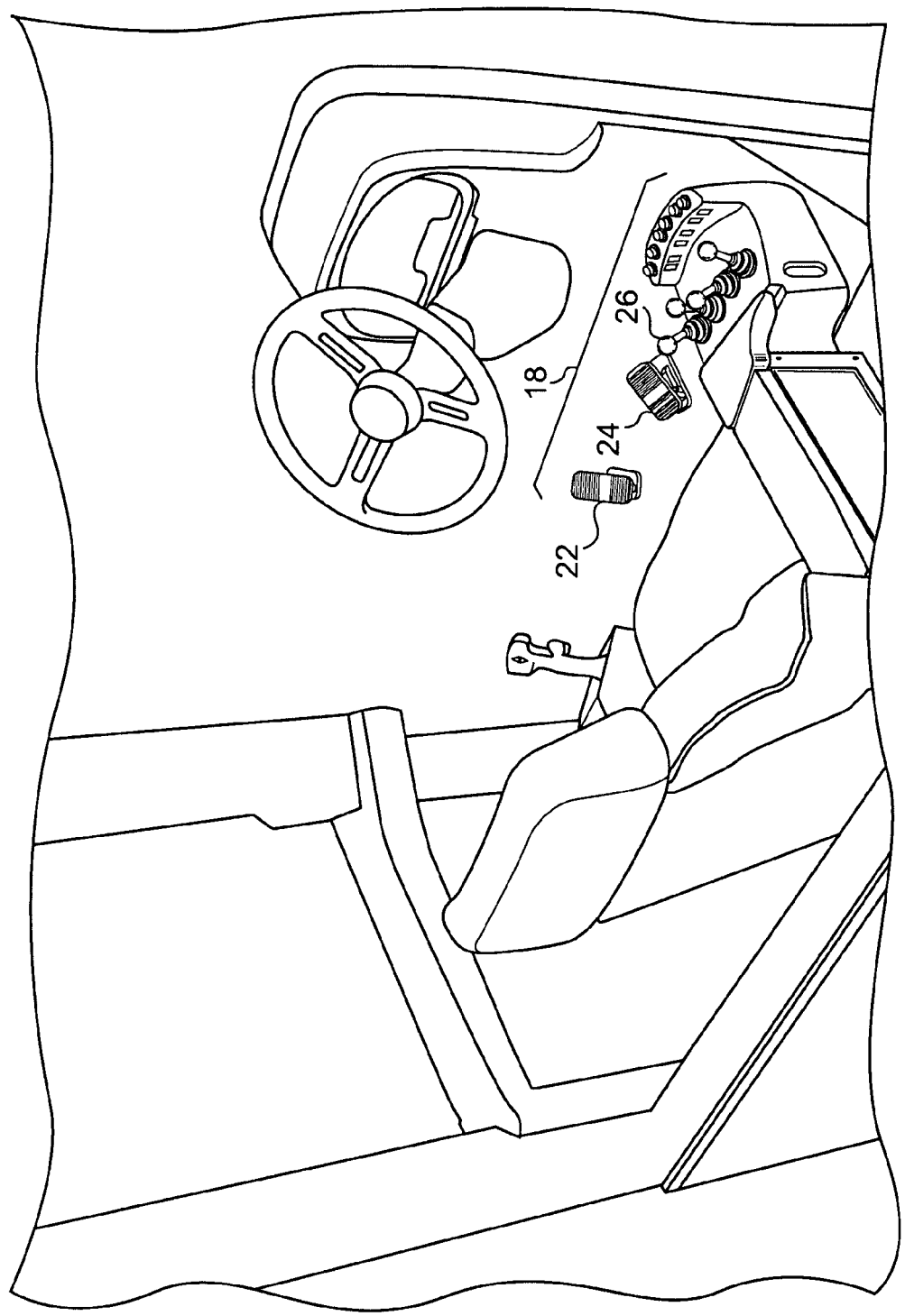
FIG. 2 is a pictorial illustration of an exemplary disclosed operator station for use with the machine of FIG. 1.

As illustrated in FIG. 2, operator station 12 may include devices that receive input from a machine operator indicative of a desired machine travel maneuver. Specifically, operator station 12 may include one or more operator interface devices 18 located proximate an operator seat 20. Operator interface devices 18 may initiate movement of machine 10 by producing displacement signals that are indicative of a desired machine maneuver. In one embodiment, operator interface devices 18 may include a left foot pedal 22, a right foot pedal 24, and a forward-neutral-reverse (FNR) selector 26. As an operator manipulates left foot pedal 22 and/or right foot pedal 24 (i.e., displaces left and/or right foot pedals 22 and 24 away from a neutral position), the operator may expect and affect a corresponding machine travel movement. In addition, as the operator moves FNR selector 26 to a forward, reverse, or neutral position, the operator may affect a corresponding transmission operating mode such as, for example, forward, reverse, or idle. It is contemplated that operator interface devices other than foot pedals such as, for example, joysticks, levers, switches, knobs, wheels, and other devices known in the art, may additionally or alternatively be provided within operator station 12 for travel control of machine 10, if desired. Furthermore, FNR selector 26 may be omitted and other operator input devices may affect the transmission operating mode.

Traction devices 14 (referring to FIG. 1) may embody wheels located on each side of machine 10 (only one side shown). Alternatively, traction devices 14 may include tracks, belts or other known traction devices. It is contemplated that any combination of the wheels on machine 10 may be driven and/or steered.

Figure 3:
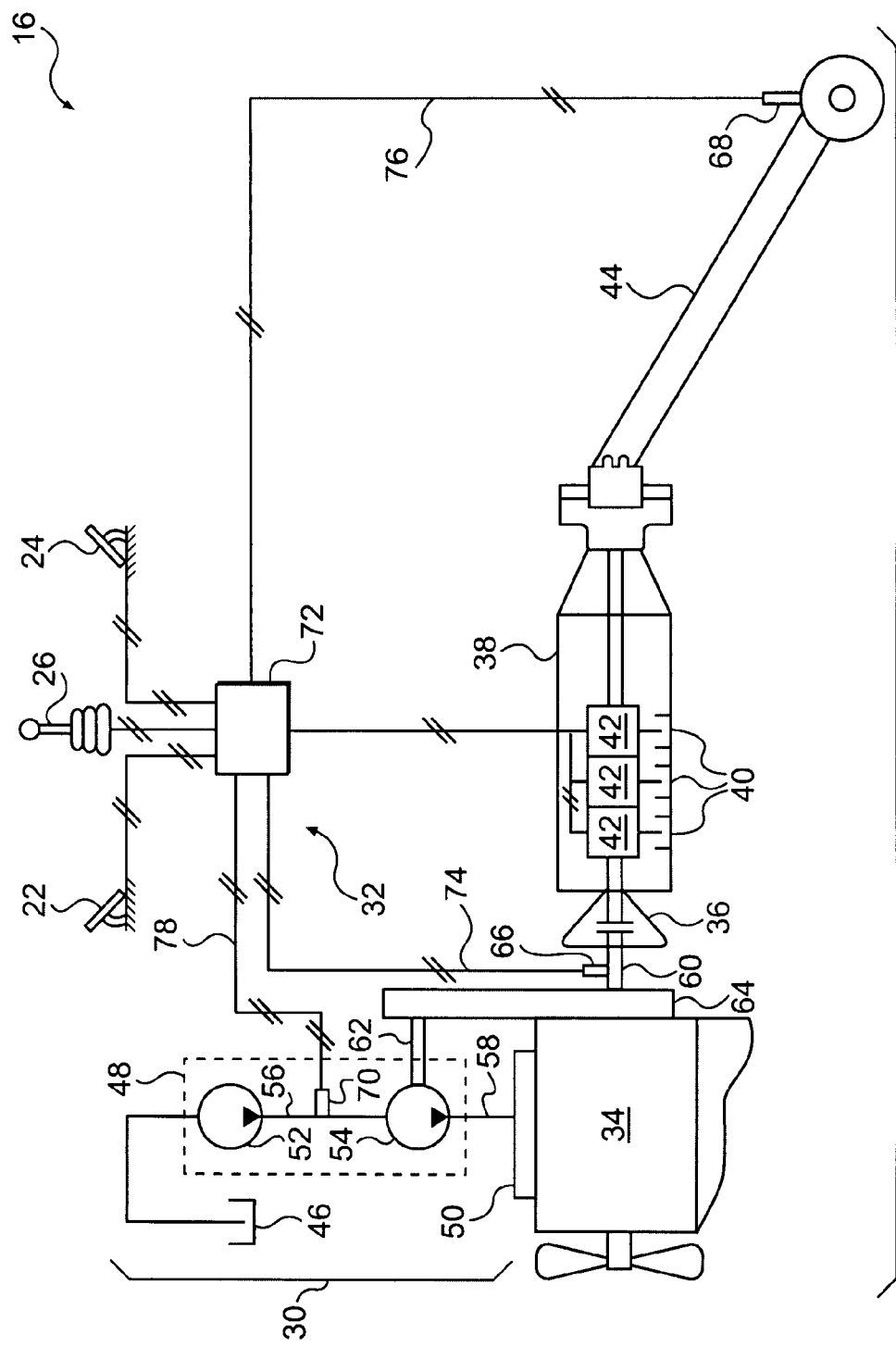
FIG. 3 is a diagrammatic illustration of an exemplary disclosed control system for use with the operator station of FIG. 2.

As illustrated in FIG. 3, power system 16 may drive traction devices 14 (referring to FIG. 1) in response to various operator and environmental inputs. Power system 16 may include a power train 28, a fuel system 30, and a control system 32 for regulating the operation of power system 16 in response to one or more inputs.

Power train 28 may be an integral package configured to generate and transmit power to traction devices 14. In particular, power train 28 may include a power source 34 operable to generate a power output, a torque converter 36, and a transmission unit 38 connected to transmit the power output in a useful manner to traction devices 14 (referring to FIG. 1)

Power source 34 may include an internal combustion engine having multiple subsystems that cooperate to produce mechanical or electrical power output. For the purposes of this disclosure, power source 34 is depicted and described as a four-stroke diesel engine. One skilled in the art will recognize, however, that power source 34 may be any other type of internal combustion engine such as, for example, a gasoline or a gaseous fuel-powered engine. The subsystems included within power source 34 may include, for example, an air induction system, an exhaust system, a lubrication system, a cooling system, or any other appropriate system.

Torque converter 36 may be a hydro-mechanical device configured to couple power source 34 to transmission unit 38. In particular, torque converter 36 may conduct pressurized fluid between the output of power source 34 and the input of transmission unit 38 to thereby drive transmission unit 38, while still allowing power source 34 to rotate somewhat independently of transmission unit 38. In this arrangement, torque converter 36 may selectively absorb and multiply the torque transferred between power source 34 and transmission unit 38 by either allowing or preventing slippage between the output rotation of power source 34 and the input rotation of transmission unit 38.

Transmission unit 38 may include numerous components that interact to transmit power from power source 34 to traction device 14. In particular, transmission unit 38 may be a multi-speed bidirectional mechanical transmission having a neutral gear output ratio, a plurality of forward gear output ratios, a reverse gear output ratio, and one or more clutches 40. The clutches 40 may be selectively actuated to engage predetermined combinations of gears 42 to produce a desired output gear output ratio. It is contemplated that transmission unit 38 may be an automatic-type transmission, with shifting based on a power source speed, a maximum selected gear output ratio, and a shift map. The output of transmission unit 38 may be connected to and configured to rotatably drive traction devices 14 via a transmission output shaft 44, thereby propelling machine 10. It is contemplated that transmission unit 38 may alternately embody a manual or continuously variable type transmission, if desired.

Fuel system 30 may include components that cooperate to deliver injections of pressurized fuel into each combustion chamber (not shown) of power source 34. Specifically, fuel system 30 may include a tank 46 configured to hold a supply of fuel and a fuel pumping arrangement 48 configured to pressurize the fuel and direct the pressurized fuel to a plurality of fuel injectors (not shown) by way of a common rail 50.

Fuel pumping arrangement 48 may include one or more pumping devices that function to increase the pressure of the fuel and direct one or more pressurized streams of fuel to common rail 50. In one example, fuel pumping arrangement 48 may include a low pressure source 52 and a high pressure source 54 disposed in series and fluidly connected by way of a fuel line 56. Low pressure source 52 may be a transfer pump configured to provide low pressure feed to high pressure source 54. High pressure source 54 may be configured to receive the low pressure feed and to increase the pressure of the fuel. High pressure source 54 may be connected to common rail 50 by way of a fuel line 58. A check valve (not shown) may be disposed within fuel line 58 to provide for unidirectional flow of fuel from fuel pumping arrangement 48 to common rail 50.

One or both of low and high pressure sources 52, 54 may be operably connected to power source 34 and driven by a crankshaft 60 associated with power source 34. Low and/or high pressure sources 52, 54 may be connected with crankshaft 60 in any manner readily apparent to one skilled in the art where a rotation of crankshaft 60 may result in a corresponding rotation of a pump drive shaft. For example, a pump driveshaft 62 of high pressure source 54 may be connected to crankshaft 60 through a gear train 64. It is contemplated; however, that one or both of low and high pressure sources 52, 54 may alternatively be driven electrically, hydraulically, pneumatically, or in any other appropriate manner.

Control system 32 may regulate the operation of power system 16 and may include sensors 66, 68, and 70 for sensing various parameters indicative of engine speed, transmission output, and fueling rate, respectively. Control system may also include a controller 72 for regulating the operation of power system 16 in response to operator requests, environmental inputs, and signals received from sensors 66, 68, and 70. It is contemplated that control system 32 may include additional sensors for sensing other parameters that may be useful for operation of power system 16.

Sensor 66 may be associated with power source 34 to sense an output speed thereof and may be in communication with controller 72 via a communication line 74. In one example, sensor 66 may embody a magnetic pickup type of sensor associated with a magnet embedded within a rotational component of power train 28 such as crankshaft 60 or a flywheel. During operation of power source 34, sensor 66 may sense the rotating magnetic field produced by the magnet and generate a signal corresponding to the rotational speed of power source 34.

Sensor 68 may be associated with transmission unit 36 and/or traction device 14 (referring to FIG. 1) to sense an output of transmission unit 36 and/or a travel speed of machine 10 and may be in communication with controller 72 via a communication line 76. In one example, sensor 68 may embody a magnetic pickup type of sensor associated with a magnet embedded within a rotational component of power train 28 such as transmission output shaft 38. During operation of machine 10, sensor 68 may sense the rotating magnetic field produced by the magnet and generate a signal corresponding to the rotational speed of transmission unit 36 and/or the corresponding travel speed of machine 10.

Sensor 70 may be associated with fuel system 30 to sense a flow rate of fuel being supplied to power source 34 and may be in communication with controller 72 via a communication line 78. In one embodiment, sensor 70 may be a fuel flow sensor located in or near fuel system 30 to monitor a flow rate of fuel being sprayed into the combustion chambers (not shown) of power source 34. It is contemplated that sensor 70 may be any other type of sensor capable of sensing a parameter indicative of a rate of fuel entering power source 34.

Controller 72 may regulate the operation of power system 16 in response to operator requests, environmental inputs, and signals received from sensors 66, 68, and 70. The operator requests may include magnitude of propulsion, direction of propulsion (i.e., forward or reverse), vehicular speed, output torque, or any other request that may affect the operation of power train 16. A plurality of maps, algorithms, charts, graphs, etc. may be stored in the memory of controller 72 for interpreting various signals indicative of the operator's request. Such signals may be received from FNR selector 26, left pedal 22, right pedal 24 and/or any other operator interface device 18. Upon determining the operator request, controller 72 may receive additional input from sensors 66, 68, and 70 and/or may receive environmental data to determine a course of action for operating power system 16.

An exemplary operator request may be a propulsion direction change of machine 10. The operator may initiate such a request by actuating various operator interface devices 18. Controller 72 may receive signals from the actuated interface devices 18 and compare the signals to the above disclosed maps, algorithms, charts, and graphs. The comparison may cause controller 72 to determine that the operator may be requesting a propulsion direction change. Before actually changing the direction of propulsion, controller 72 may cause transmission unit 36 to downshift to a lower gear ratio, thereby retarding propulsion in the current direction. However, such a downshift may cause the engine speed to spike above a threshold engine speed before the fueling rate can be reduced to compensate for the lower gear ratio. To counter this engine speed spike, controller 72 may, before performing the downshift, override an operator request related to a target engine speed. Controller 72 may set the target engine speed to a level sufficiently low enough to cause fuel system 30 to stop supplying fuel to power source 34. Lowering the engine speed to such a level may prevent the engine speed spike from exceeding the threshold engine speed. In addition, terminating the flow of fuel to power source 34 may maximize the amount of power that power source 34 may absorb during the propulsion direction change event, thereby maximizing the amount of retarding force drive train 28 may provide.

Controller 72 may embody a single microprocessor or multiple microprocessors for controlling the operation of power system 16 in response to various received signals. Numerous commercially available microprocessors can be configured to perform the functions of controller 72. It should be appreciated that controller 72 could readily embody a general machine microprocessor capable of controlling numerous machine functions. Controller 72 may include a memory, a secondary storage device, a processor, and any other components for running an application. Various other circuits may be associated with controller 72 such as power supply circuitry, signal conditioning circuitry, solenoid driver circuitry, and other types of circuitry.

Figure 4:
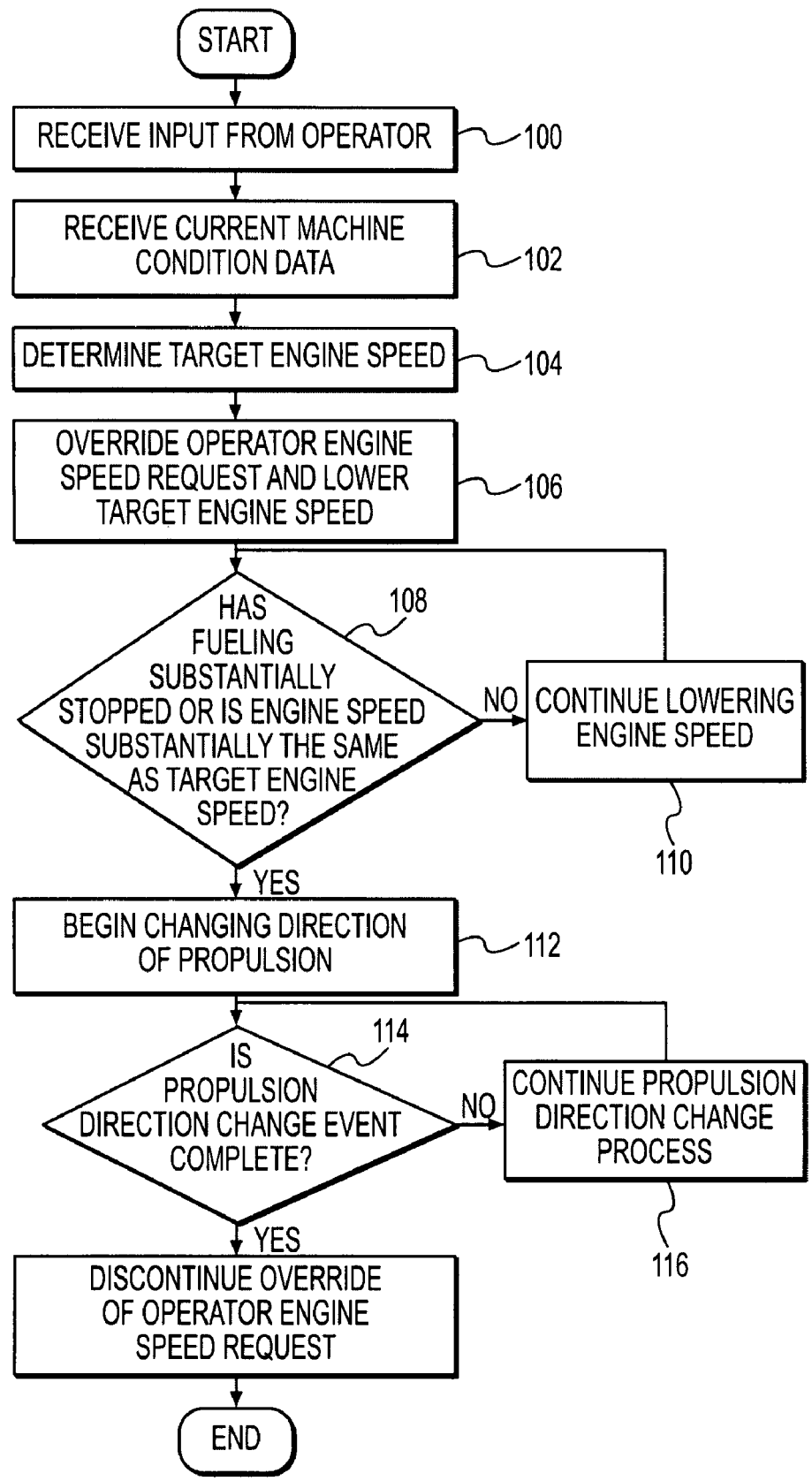
FIG. 4 is a flow diagram illustrating an exemplary method for operating the control system of FIG. 3.

FIG. 4 illustrates an exemplary method of controlling power system 16. In particular, FIG. 4 is a flow chart representing an exemplary method for regulating the fueling rate for power source 34 when an operator requests a propulsion direction change. FIG. 4 will be discussed further in the following section to better illustrate the disclosed system and its operation.

INDUSTRIAL APPLICABILITY

The disclosed power system may be able to change the direction of propulsion of a machine without exceeding the maximum desirable engine speed. In particular, the disclosed system may override an operator request for a target engine speed and lower the target engine speed to a level low enough to cause the fueling system to stop providing fuel to the engine. This may prevent the fueling system from causing the engine speed to exceed the maximum desirable engine speed when the drive train retarding is initiated. The method for changing a direction of propulsion will be described below.

As illustrated in FIG. 4, the method may begin when controller 72 receives input from the operator indicative of a desire to change the direction of propulsion (step 100). For example, if machine 10 is being propelled in a forward direction, the operator may desire to change the propulsion direction and begin propelling machine 10 in a reverse direction. Such signals may be generated when the operator manipulates one or more operator input devices 18. For example, the operator may cause signals to be generated by manipulating left pedal 22, right pedal 24, and/or FNR selector 26.

Upon receiving the signal indicative of changing the direction of propulsion, controller 72 may receive current machine condition data from sensors 66, 68, and 70 (step 102). Such data may include, for example, current engine speed, current transmission output, and current fueling rate. After receiving the machine condition data, controller 72 may determine a target engine speed, at which fuel system 30 may stop supplying power source 34 with fuel (step 104). The target engine speed may be determined by comparing the current machine condition data with various maps, algorithms, charts, and/or graphs stored within the memory of controller 72. It is contemplated that controller 72 may use additional data received from other sensors to determine the target engine speed, if desired.

After determining the target engine speed, controller 72 may override an operator's requested target engine speed and begin lowering the current engine speed (step 106). While lowering the engine speed, controller 72 may continue to monitor the fueling rate and the engine speed to determine if the fuel system 30 has substantially stopped supplying power source 34 with fuel or if the current engine speed is substantially the same as the target engine speed (step 108). If controller 72 determines that either fuel system 30 is still supplying power source 34 with fuel or the current engine speed is not substantially the same as the target engine speed (step 108: No), controller 72 may continue lowering the engine speed (step 110). After lowering the engine speed, step 106 may be repeated (i.e., controller 72 may continue to monitor the fueling rate and the engine speed to determine if the fuel system 30 has substantially stopped supplying power source 34 with fuel or if the current engine speed is substantially the same as the target engine speed).

If controller 72 determines that fuel system 30 has substantially stopped supplying power source 34 with fuel or that the current engine speed is substantially the same as the target engine speed (step 108: Yes), Controller 72 may cause transmission unit 38 to begin changing the direction of propulsion (step 112). The propulsion direction change may be initiated by causing transmission unit 28 to downshift to a lower gear ratio. This may use parasitic losses to reduce propulsion in the current direction. Controller 72 may perform one or more downshifts until the propulsion direction change event is complete.

After performing the downshifting event, controller 72 may determine if the propulsion direction change event is complete (step 114). This determination may be made by monitoring the transmission output signals from sensor 68. For example, controller 72 may determine that the propulsion direction change event is complete if sensor 68 transmits a signal indicating that the vehicular speed of machine 10 is zero.

If controller 72 determines that the propulsion direction change event is not complete (step 114: No), controller 72 may continue the propulsion direction change process (step 116). For example, controller 72 may either continue operating transmission unit 38 at the current gear ratio or perform another downshifting event. While continuing the propulsion direction change process, controller 72 may repeat step 114 (i.e., controller 72 may determine if the propulsion direction change event is complete). If controller 72 determines that the propulsion direction change event is complete (step 114: Yes), controller 72 may discontinue the override of the operator's engine speed request (step 118). The method may terminate after performing step 118.

Because the system may override the operator engine speed request in response to a propulsion direction change request, the likelihood of the engine speed exceeding a threshold engine speed may be reduced. In particular, overriding the operator engine speed request in response to the propulsion change request may prevent the actual engine speed from exceeding the threshold engine speed even when the requested target engine speed is below the threshold.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A power train for a machine, comprising:
   an engine operably coupled to a transmission;
   at least one operator interface device configured to generate an operator request; and
   a controller configured to, in response to a first operator request for changing between opposite propulsion directions of the machine, override a second operator request for a desired target engine speed by lowering a current engine speed to a modified target engine speed that is below the desired target engine speed.

2. The power train of claim 1, wherein the controller is further configured to begin changing between opposite propulsion directions of the machine after the controller has stopped lowering the engine speed.

3. The power train of claim 2, wherein the controller is further configured to stop overriding the second operator request when performance of the change between opposite propulsion directions of the machine is complete.

4. The power train of claim 3, wherein the controller is further configured to calculate the modified target engine speed based on a sensed current engine speed and a sensed current fuel rate, the modified target engine speed being sufficiently below a threshold engine speed to prevent an actual engine speed from exceeding the threshold engine speed when the change between opposite propulsion directions of the machine is performed.

5. The power train of claim 4, wherein the controller is further configured to continue lowering the engine speed until the sensed current engine speed is substantially the same as the modified target engine speed.

6. The power train of claim 4, wherein the controller is further configured to continue lowering the engine speed until the sensed current fuel rate is substantially zero.

7. The power train of claim 1, wherein the at least one operator interface includes a first operator interface and a second operator interface, the first operator interface being configured to generate the first operator request, and the second operator interface being configured to generate the second operator request.

8. A method for operating a power system, comprising:
   receiving a first operator request for a change in a direction of propulsion of a machine;
   receiving a second operator request for a desired target engine speed; and
   overriding the second operator request in response to the first operator request by lowering a current engine speed to a modified target engine speed that is below the desired target engine speed.

9. The method of claim 8, further including sensing a first parameter indicative of engine speed and sensing a second parameter indicative a transmission output.

10. The method of claim 9, further including calculating the modified target engine speed, the calculation being based on the sensed engine speed and sensed transmission output.

11. The method of claim 10, further including lowering the engine speed until the current engine speed is substantially the same as the modified target engine speed.

12. The method of claim 9, further including sensing a third parameter indicative of a flow rate of fuel being supplied to an engine of the power system.

13. The method of claim 12, further including lowering the engine speed until the current flow rate of fuel being supplied to the engine is substantially zero.

14. The method of claim 8, further including overriding the second operator request until performance of the change in the direction of propulsion of the machine is complete.

15. A machine, comprising:
    an engine operably coupled to a transmission;
    at least one operator interface device configured to generate a first operator request for a change in a propulsion direction of the machine and a second operator request for a desired target engine speed; and
    a controller configured to, in response to the first operator request, override the second operator request by lowering a current engine speed to a modified target engine speed that is below the desired target engine.

16. The machine of claim 15, wherein the controller is further configured to begin changing the propulsion direction after the controller has stopped lowering the engine speed.

17. The machine of claim 16, wherein the controller is further configured to stop overriding the second operator request when performance of the change in the propulsion direction is complete.

18. The machine of claim 17, wherein the controller is further configured to calculate the modified target engine speed based on a sensed current engine speed and a sensed current fuel rate, the modified target engine speed being sufficiently below a threshold engine speed to prevent an actual engine speed from exceeding the threshold engine speed when the change in the propulsion direction is being performed.

19. The machine of claim 18, wherein the controller is further configured to continue lowering the engine speed until the current engine speed is substantially the same as the modified target engine speed.

20. The machine of claim 18, wherein the controller is further configured to continue lowering the engine speed until the sensed current fuel rate is substantially zero.

* * * * *